United States Patent
Johnston et al.

(10) Patent No.: US 12,529,672 B2
(45) Date of Patent: Jan. 20, 2026

(54) ELECTROCHEMICAL SENSOR

(71) Applicant: Palintest Limited, Gateshead (GB)

(72) Inventors: Simon Richard Johnston, Chollerton (GB); Stephen William Birch, Whitley Bay (GB); Samantha Lunn, South Shields (GB); James Iacobini, Stanley (GB)

(73) Assignee: Palintest Limited, Gateshead (GB)

( * ) Notice: Subject to any disclaimer, the term of this patent is extended or adjusted under 35 U.S.C. 154(b) by 352 days.

(21) Appl. No.: 18/021,155

(22) PCT Filed: Sep. 16, 2021

(86) PCT No.: PCT/GB2021/052406
§ 371 (c)(1),
(2) Date: Feb. 13, 2023

(87) PCT Pub. No.: WO2022/064177
PCT Pub. Date: Mar. 31, 2022

(65) Prior Publication Data
US 2024/0044830 A1    Feb. 8, 2024

(30) Foreign Application Priority Data

Sep. 24, 2020  (GB) .................................. 2015116

(51) Int. Cl.
*G01N 27/30* (2006.01)
*G01N 33/18* (2006.01)

(52) U.S. Cl.
CPC ......... *G01N 27/307* (2013.01); *G01N 33/182* (2013.01)

(58) Field of Classification Search
CPC .. G01N 27/307; G01N 27/30; G01N 27/4166; G01N 27/308; G01N 27/27; G01N 27/4045; G01N 27/403; G01N 33/182; G01N 33/18; B41J 29/44
See application file for complete search history.

(56) References Cited

U.S. PATENT DOCUMENTS

| | | | |
|---|---|---|---|
| 2005/0056551 A1 | 3/2005 | White et al. | |
| 2014/0017709 A1* | 1/2014 | Lowe | G01N 33/5438 435/7.92 |
| 2014/0083864 A1 | 3/2014 | Rowhani et al. | |
| 2015/0285779 A1 | 10/2015 | West et al. | |
| 2019/0033246 A1* | 1/2019 | Johnston | G01N 27/406 |

FOREIGN PATENT DOCUMENTS

WO     2018044976 A1     3/2018

OTHER PUBLICATIONS

Vera et al. Water Research, 2017, 113 (Year: 2017).*
Fabian Soltermann et al., Comparison of a novel extraction-based colorimetric (ABTS) method with membrane introduction mass spectrometry (MIMS): Trichloramine dynamics in pool water, Elsevier Water Research, 2014, pp. 258-268.
Millipore Sigma, 2,2'-Azino-bis(3-ethylbenzothiazoline-6-sulfonic acid) diammonium salts, Applications, [Sep. 13, 2024] webpage at https://www.sigmaaldrich.com/US/en/product/sigma/a1888?msockid=2e69e92d1996754374f7a0fd0be6681.

* cited by examiner

*Primary Examiner* — Gurpreet Kaur
(74) *Attorney, Agent, or Firm* — KIRTON McCONKIE; Evan R. Witt

(57) ABSTRACT

The present invention relates to an electrochemical sensor for determining the presence or quantity of an analyte (eg free chlorine) in a sample.

7 Claims, 4 Drawing Sheets

ELECTROCHEMICAL SENSOR

The present invention relates to an electrochemical sensor for determining the presence or quantity of an analyte (eg free chlorine) in a sample.

Detection of free chlorine is typically carried out by colorimetry. The most widely used colorimetric methods use N, N-diethyl-p-phenyldiamine (DPD). Other methods use tetramethylbenzidine (TMB), the diammonium salt of 2,2'-azino-bis(3-ethylbenzothiazoline-6-sulfonic acid) (ABTS), orthotolidine or syringaldazine.

These methods may be restricted in range due to the mechanism by which the chromophore is generated in the presence of free chlorine. At high free chlorine concentrations, the method may suffer from "fading" or "bleaching" of the colour. It is widely recognised for example that bleaching of DPD occurs in samples with a free chlorine content of 10 mg/L or more.

By way of example of this phenomenon, DPD undergoes a two step oxidation. In the first oxidation step, DPD reacts with small amounts of chlorine at near neutral pH to produce the Wurster dye as the principal oxidation product. At higher oxidation levels (typically free chlorine concentration which equates to a free chlorine:DPD ratio of about a second oxidation step is favoured forming an unstable colourless imine to which is attributable the visual effect of bleaching. FIG. 4 and Table 1 show the concentration of products from the reactions between HOCl (free chlorine) and DPD at various molar ratios. DPD, DPD$^+$ and DPD$^{2+}$ refer to the starting reagent, 1st electron oxidation product and 2nd electron oxidation product respectively. It can be seen that the concentration of DPD$^+$ diminishes at [HOCl]/[DPD] ratios greater than ~0.50:1. Thus the bleaching of DPD restricts its use in determining free chlorine to a low concentration range.

TABLE 1

| [HOCl]/[DPD] | [DPD] (mM) | [DPD$^+$] (mM) | [DPD$^{2+}$] (mM) |
| --- | --- | --- | --- |
| 0 | 5.7E−02 | 1.9E−04 | 2.9E−03 |
| 0.25 | 4.2E−02 | 1.8E−02 | 6.4E−03 |
| 0.5 | 3.5E−02 | 2.3E−02 | 1.4E−02 |
| 0.67 | 3.4E−02 | 2.2E−02 | 2.0E−02 |
| 0.75 | 3.4E−02 | 2.0E−02 | 2.3E−02 |
| 1 | 3.3E−02 | 1.2E−02 | 2.9E−02 |
| 1.25 | 3.1E−02 | 5.9E−03 | 3.0E−02 |
| 1.5 | 2.6E−02 | 2.6E−03 | 2.7E−02 |

The one electron oxidation of TMB yields a TMB cation free radical. This species is in equilibrium with the blue charge transfer complex of TMB. Further oxidation yields the TMB diimine which is bright yellow. FIG. 5 and Table 2 show the concentration of products from the reactions between HOCl (free chlorine) and TMB at various molar ratios. TMB, TMB-TMB$^{2+}$ and TMB$^{2+}$ refer to the starting reagent, 1st electron oxidation product and 2nd electron oxidation product respectively. It can be seen that the concentration of TMB-TMB$^{2+}$ diminishes at [HOCl]/[TMB] ratios greater than ~0.5.

TABLE 2

| [HOCl]/[TMB] | [TMB] (mM) | [TMB---TMB$^{2+}$] (mM) | [TMB$^{2+}$] (mM) |
| --- | --- | --- | --- |
| 0 | 2.6E−02 | 2.6E−05 | 1.7E−05 |
| 0.5 | 5.3E−03 | 8.2E−03 | 3.3E−03 |
| 0.75 | 2.7E−03 | 5.8E−03 | 1.3E−02 |
| 1 | 1.3E−03 | 5.4E−04 | 2.7E−02 |
| 1.5 | 1.8E−03 | 5.1E−05 | 2.5E−02 |
| 2 | 2.8E−03 | 1.3E−04 | 2.0E−02 |

The first oxidation step for ABTS forms the radical cation ABTS$^+$ with overoxidation resulting in the azodication ABTS$^{2+}$ which is unstable in aqueous solution. The characteristic blue colour from the indicator may be retained at concentrations of free chlorine up to 250 mg/L depending on the amount of ABTS that is present. In bulk solution, the loss of colour in the presence of free chlorine takes place when the free chlorine:ABTS ratio is >5:1.

The molecular extinction coefficient is a measure of how strongly a compound absorbs light at a particular wavelength. In the case of ABTS, the molar extinction coefficient is high (about 28,500M$^{-1}$ cm$^{-1}$ at 405 nm) which enables colorimetric detection of free chlorine at low levels. However the high molar extinction coefficient prevents the use of ABTS for colorimetric analysis at high chlorine concentrations. The linear calibration range for chlorine was established as 0.07-0.7 mg$^{-1}$.

TABLE 3

| [HOCl]/[ABTS] | [ABTS] (mM) | [ABTS$^+$] (mM) | [ABTS$^{2+}$] (mM) |
| --- | --- | --- | --- |
| 0 | 2.8E−02 | 6.7E−05 | 2.8E−05 |
| 0.5 | 2.0E−02 | 4.4E−03 | 6.9E−04 |
| 1 | 1.2E−02 | 1.3E−02 | 1.5E−03 |
| 2 | 6.4E−03 | 1.9E−02 | 2.1E−03 |
| 3 | 4.6E−03 | 2.1E−02 | 2.3E−03 |
| 4 | 5.1E−03 | 1.9E−02 | 2.2E−03 |
| 5 | 3.9E−03 | 2.1E−02 | 2.3E−03 |

FIG. 2 and Table 3 show the concentration of products from the reaction between HOCl (free chlorine) and ABTS at various molar ratios. ABTS, ABTS$^+$ and ABTS$^{2+}$ refer to the starting reagent, 1st electron oxidation product and 2nd electron oxidation product respectively. It can be seen that the concentration of ABTS$^+$ increases and levels off at [HOCl]/[ABTS] ratios between 2 and 5.

The present invention is based on the recognition that the relative stability of radical cations such as ABTS$^+$ at high free chlorine concentrations may be conferred by the size of the molecule and the presence of sulfonic groups enabling extensive electron delocalisation which facilitates the use of such species for electrochemical detection of free chlorine at high concentrations at which their use in colorimetry is precluded.

Thus viewed from a first aspect the present invention provides an electrochemical sensor for determining the presence or quantity of an analyte in a sample comprising:
  an elongate substrate layer having a first end opposite to a second end;
  first, second and third conductive tracks deposited axially onto the substrate layer in a substantially parallel mutually spaced apart relationship, wherein the first conductive track constitutes a reference electrode, wherein on the second conductive track near to the second end of the substrate layer is a conductive deposit whereby to constitute a counter electrode and on the third conductive track near to the second end of the substrate layer is a conductive deposit whereby to constitute a working electrode, wherein each of the first, second and third conductive tracks terminates near to the first end of the substrate layer in an electrical contact;

a non-conductive layer deposited on the first, second and third conductive tracks, wherein the non-conductive layer is fabricated to fully expose each electrical contact near to the first end of the substrate layer, to expose the conductive deposit on the second conductive track near to the second end of the substrate layer, to expose the first conductive track near to the second end of the substrate layer and to expose one or more discrete working regions of the conductive deposit of the third conductive track near to the second end of the substrate layer; and a reagent formulation of a salt of 2,2'-azino-bis(3-ethyl-benzothiazoline-6-sulfonic acid) (ABTS) or a salt of N,N'-bis(2,4-di-sulfobenzyl)tolidine (SBT) deposited on or near to the one or more discrete working regions of the conductive deposit of the third conductive track.

In a preferred embodiment, the electrochemical sensor comprises a reagent formulation of a salt of ABTS. At the surface of the sensor, the salt of ABTS is present at a higher localised concentration which makes the formation of the azodication $ABTS^{2+}$ in the second oxidation step advantageously less likely than in bulk solution.

Preferably the salt of ABTS is the diammonium salt of ABTS.

Preferably the salt of SBT is the tetrasodium salt of SBT.

The reagent formulation may further comprise one or more additives such as a buffer, gelling agent, thickening agent, viscosity modifier, wetting agent or stabiliser. Typical additives are one or more of the group consisting of ethanol, sodium phosphate, potassium phthalate, sodium carbonate, disodium EDTA, hydroxylethylcellulose, carboxymethylcellulose (CMC) and polyvinylpyrrolidone.

Preferably the reagent formulation comprises a buffer which in use maintains the pH in the range 5 to 6. This serves advantageously to limit the interference of monochloramine in the measurement. Preferably the buffer is an acidic salt (eg sodium hydrogen sulphate or sodium maleate).

The reagent formulation may take the form of a reagent layer. The reagent formulation may be deposited and dried on or near to the one or more discrete working regions of the conductive deposit to form the reagent layer.

The reagent layer may include a porous matrix. The reagent layer may include a porous matrix impregnated with the reagent. The porous matrix may comprise polyvinylpyrrolidone and/or hydroxyethylcellulose. The reagent may be impregnated in the porous matrix by printing or microdosing.

The reagent formulation may take the form of a plurality of reagent doses. The reagent formulation may be deposited discretely and dried on or near to the one or more working regions of the conductive deposit to form the reagent doses.

The electrochemical sensor may further comprise a porous membrane mounted on or adjacent to the non-conducting layer overlying the reagent formulation. Alternatively the electrochemical sensor may be membrane-free.

Preferably the second conductive track is between the first conductive track and the third conductive track.

The third conductive track may be between the first conductive track and the second conductive track.

In a preferred embodiment of the invention, the electrochemical sensor further comprises:

a fourth conductive track deposited axially onto the substrate layer, wherein the first, second, third and fourth conductive track are in a substantially parallel mutually spaced apart relationship, wherein on the fourth conductive track near to the second end of the substrate layer is a conductive deposit whereby the third and fourth conductive tracks constitute a pair of working electrodes, wherein each of the first, second, third and fourth conductive tracks terminates near to the first end of the substrate layer in an electrical contact, wherein the non-conductive layer is deposited on the first, second, third and fourth conductive tracks and is fabricated to fully expose each electrical contact near to the first end of the substrate layer, to expose the conductive deposit on the second conductive track near to the second end of the substrate layer, to expose the first conductive track near to the second end of the substrate layer, to expose one or more discrete working regions of the conductive deposit of the third conductive track and to expose one or more discrete working regions of the conductive deposit of the fourth conductive track, wherein an additional reagent formulation is deposited on or near to the one or more discrete working regions of the conductive deposit of the fourth conductive track.

The first and second conductive tracks may be flanked by the third and fourth conductive tracks.

The first and third conductive tracks may be flanked by the second and fourth conductive tracks.

The additional reagent formulation may further comprise one or more additives such as a buffer, gelling agent, thickening agent, viscosity modifier, wetting agent or stabiliser. Typical additives are one or more of the group consisting of ethanol, sodium phosphate, potassium phthalate, sodium carbonate, disodium EDTA, hydroxylethylcellulose, carboxymethylcellulose (CMC) and polyvinylpyrrolidone.

The additional reagent formulation may take the form of a reagent layer. The additional reagent formulation may be deposited and dried on or near to the one or more discrete working regions of the conductive deposit to form the reagent layer.

The reagent layer may include a porous matrix. The reagent layer may include a porous matrix impregnated with the reagent. The porous matrix may comprise polyvinylpyrrolidone and/or hydroxyethylcellulose. The reagent may be impregnated in the porous matrix by printing or microdosing.

The additional reagent formulation may take the form of a plurality of additional reagent doses. The additional reagent formulation may be deposited discretely and dried on or near to the one or more working regions of the conductive deposit to form the additional reagent doses.

The additional reagent formulation may be a formulation of TMB, DPD, orthotolidine or syringaldazine. Preferably the additional reagent formulation is an additional reagent formulation of TMB.

In a preferred embodiment, the reagent formulation is a reagent formulation of a salt of ABTS and the additional reagent formulation is an additional reagent formulation of TMB. This embodiment constitutes a dual sensor which may advantageously be operational at high and low concentration of (for example) free chlorine at a single potential.

Preferably a discrete working region of the conductive deposit of the third conductive track (and (if present) of the fourth conductive track) is exposed through a window. Particularly preferably the window exposes the conductive deposit on the second conductive track and the first conductive track near to the second end of the substrate layer.

Preferably a plurality of discrete working regions of the conductive deposit of the third conductive track (and (if present) of the fourth conductive track) is exposed through an array of apertures.

The electrochemical sensor may further comprise: a deposit of a supporting electrolyte deposited on the non-conductive layer.

The deposit of supporting electrolyte may take the form of a plurality of doses deposited in a substantially parallel mutually spaced apart relationship to the first, second and third conductive track (and (if present) to the fourth conductive track).

The deposit of a supporting electrolyte may be deposited on a region of the non-conductive layer between (eg exclusively between) the first conductive track and the third conductive track.

The deposit of a supporting electrolyte may be deposited on a region of the non-conductive layer which is not between any of the conductive deposit on the second conductive track, the third conductive track, the first conductive track and the fourth conductive track.

The supporting electrolyte may be KCl, KBr or $KNO_3$.

An array of apertures may be fabricated in the non-conductive layer by a mechanical, chemical or physical removal technique such as ablation (eg photoablation) or etching. The array of apertures may be fabricated in the non-conductive layer by screen printing.

Each aperture may have a substantially regular shape. Typically the apertures are uniformly shaped. Each aperture may be substantially circular or non-circular (eg rectangular or square).

Each aperture may be elongate (eg linear). Each elongate aperture may be substantially parallel to the first, second, third and fourth conductive track (eg vertical).

Preferably each elongate aperture is substantially perpendicular to the first, second, third and fourth conductive track (eg horizontal).

Preferably each aperture is substantially circular.

The array may adopt any suitable pattern (eg cubic or rectangular). The array may comprise 10 to 500 apertures, preferably 50 to 200 apertures, more preferably 80 to 120, most preferably about 95 apertures.

Preferably each aperture has a dimension (eg diameter) in the range 50 to 400 µm (eg about 350 µm).

Each aperture may be elongate (eg linear). Each elongate aperture may be substantially parallel to the first, second and third conductive track (eg vertical).

Preferably each elongate aperture is substantially perpendicular to the first, second and third conductive track (eg horizontal).

In a preferred embodiment, each aperture of the array of apertures is substantially rectangular (eg a microband). For example, each aperture may be microscopic in width (eg about 50 microns) and macroscopic in length.

In a preferred embodiment, the array of apertures is a substantially rectangular array.

The non-conductive layer may be fabricated by a known deposition or growth technique such as printing (eg screen printing, silk screen printing, ink-jet printing or thick film printing), casting, spinning, sputtering, lithography, vapour deposition, spray coating or vacuum deposition. Preferably the non-conductive layer is fabricated by screen printing. The non-conductive layer may be composed of a non-conductive ink.

The substrate layer may be a sheet or strip. The substrate layer is typically composed of an insulating polymer. The substrate layer may be composed of polyester, polycarbonate or polyvinyl chloride.

Each conductive track may be fabricated by a known deposition or growth technique such as printing (eg screen printing, silk screen printing or thick film printing), casting, spinning, sputtering, lithography, vapour deposition, spray coating, ablation or vacuum deposition. Each conductive track may be composed of an inert metal such as gold, silver or platinum. Each conductive track may be composed of a conductive ink such as silver or silver/silver chloride ink. The conductive ink may be printable.

The conductive deposit may be a gold, platinum, silver or carbon deposit.

The carbon deposit on each conductive track may be deposited by known techniques such as printing (eg screen printing, silk screen printing, ink-jet printing or thick film printing), sputtering, lithography, vapour deposition, spray coating or vacuum deposition. The carbon deposit may be composed of inert carbon such as graphite, glassy carbon, pyrolytic carbon, carbon nanotubes, graphene or carbon modified with metallic nanoparticles or electrochemically active agents.

Typically the electrochemical sensor is interfaced with an instrument (preferably a portable field instrument) in a system which facilitates the electrochemical sensor to be operated amperometrically.

The electrochemical sensor may be integrated in an on-line system. Alternatively the electrochemical sensor may be portable. The electrochemical sensor may be single-use (eg disposable). Typically the quantity of the analyte is its concentration.

Typically the analyte is an oxidant of interest. The analyte may be one or more of the group consisting of chlorine dioxide, chlorine, chlorite, hypochlorite, free chlorine, total chlorine, ozone, peracetic acid, hydrogen peroxide, bromine and monochloramine.

In a preferred embodiment, the analyte is free chlorine.

The analyte may be present in an aqueous or non-aqueous solution (eg an alcohol or hydrocarbon). The aqueous solution may be potable water, recreational water, process water or waste water (eg industrial waste water). Preferred is potable water.

The analyte may be brought into contact with the working electrode by dipping the working electrode into the sample of the analyte or by dosing the sample of the analyte onto the working electrode.

The present invention will now be described in a non-limitative sense with reference to the accompanying Figures in which.

Figure 1:
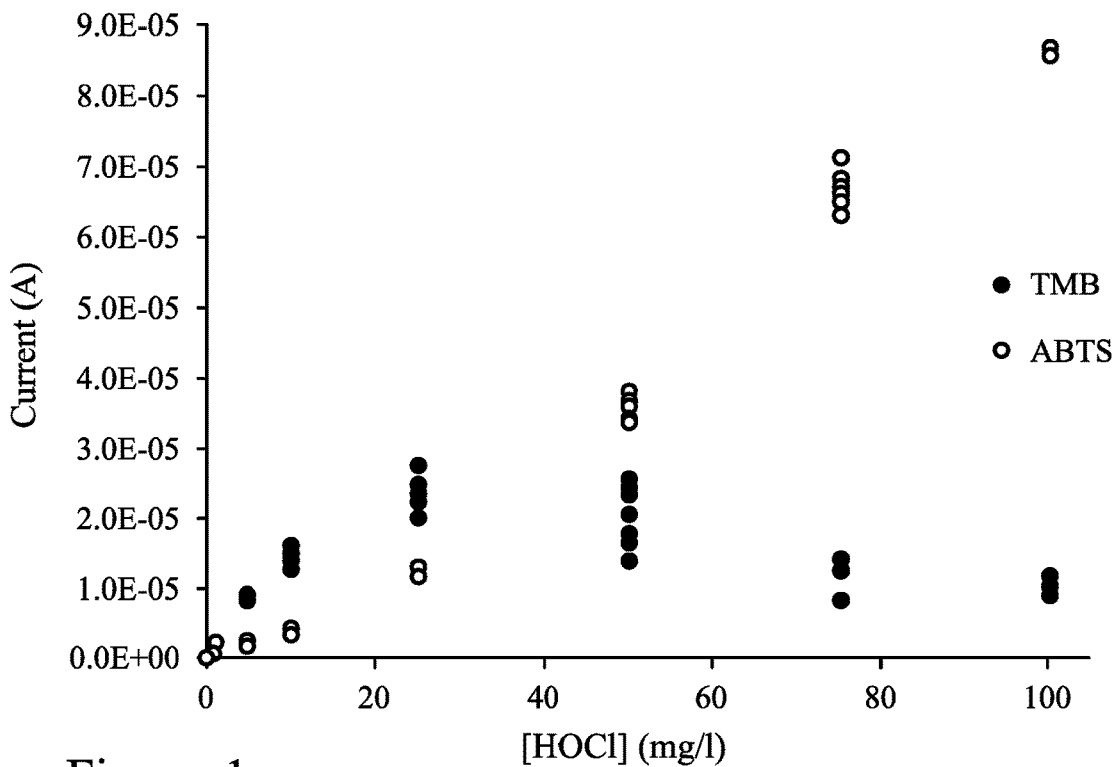
FIG. 1 shows the current response of a commercial electrochemical sensor (Chlorosense™) which is based on TMB vs free chlorine (HOCl) concentration and of the current response of an embodiment of the invention.
Figure 2:
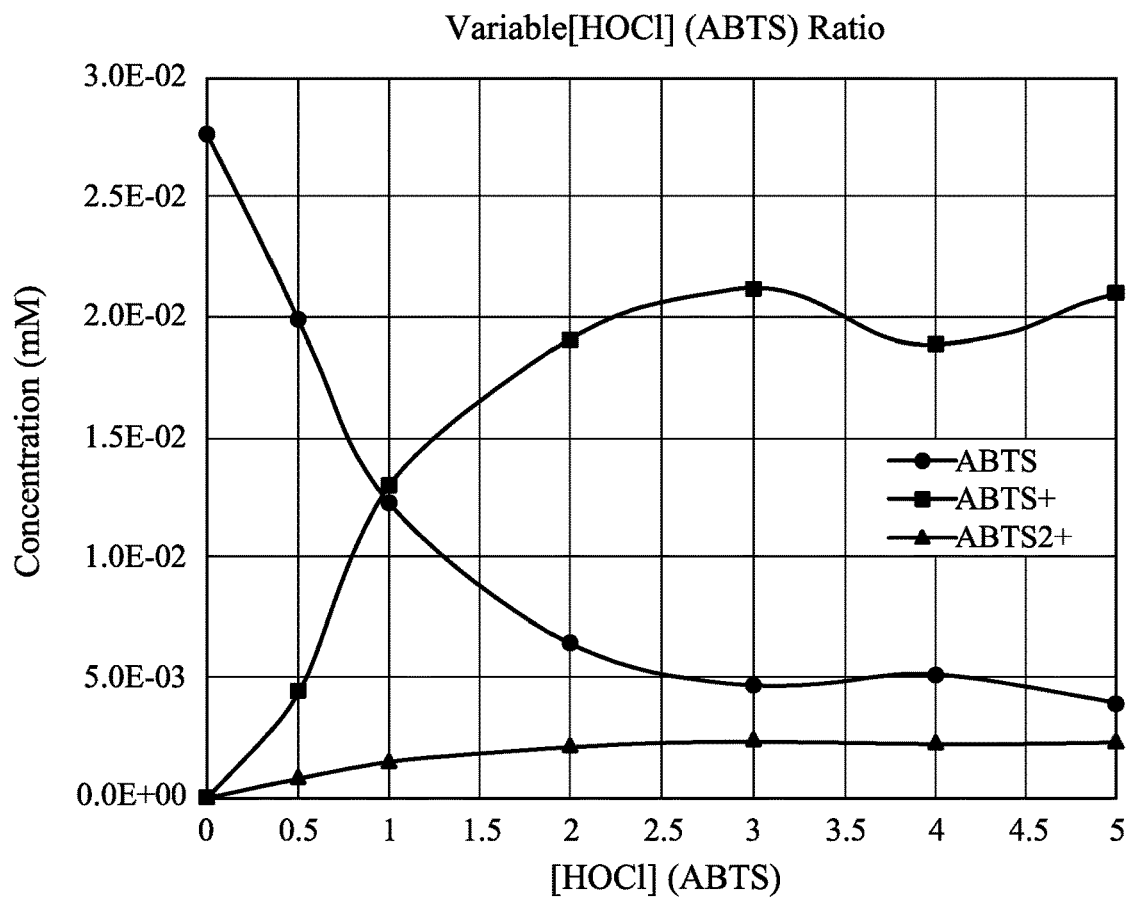
FIG. 2 illustrates the reaction of ABTS diammonium salt with various concentrations of HOCl.

FIG. 1 shows the current response at 20° C. of a commercial electrochemical sensor (Chlorosense™) which is based on TMB vs free chlorine (HOCl) concentration and of the current response of an embodiment of the invention. The high concentration of TMB at the electrode surface allows TMB to work effectively up to a maximum of 25 mg/L. Above 25 mg/L there is much more variability in results and no enhancement of electrochemical signal is observed between 25 and 50 mg/L. The signal response for ABTS diammonium salt increases consistently throughout the concentration range allowing the detection of free chlorine up to concentrations of 100 mg/L.

Figure 3:
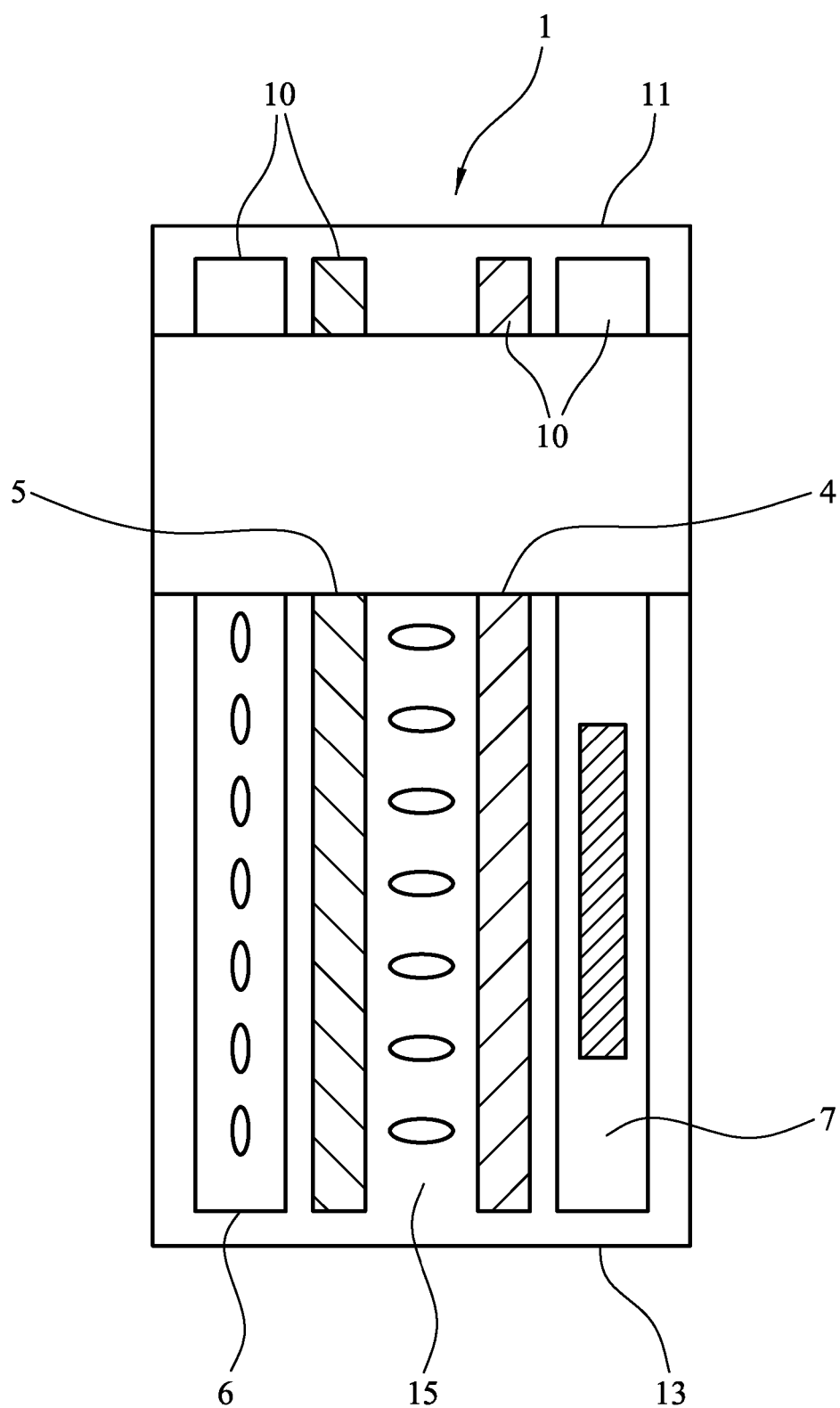
FIG. 3 shows schematically an embodiment of an electrochemical sensor of the invention (a dual sensor)
Figure 4:
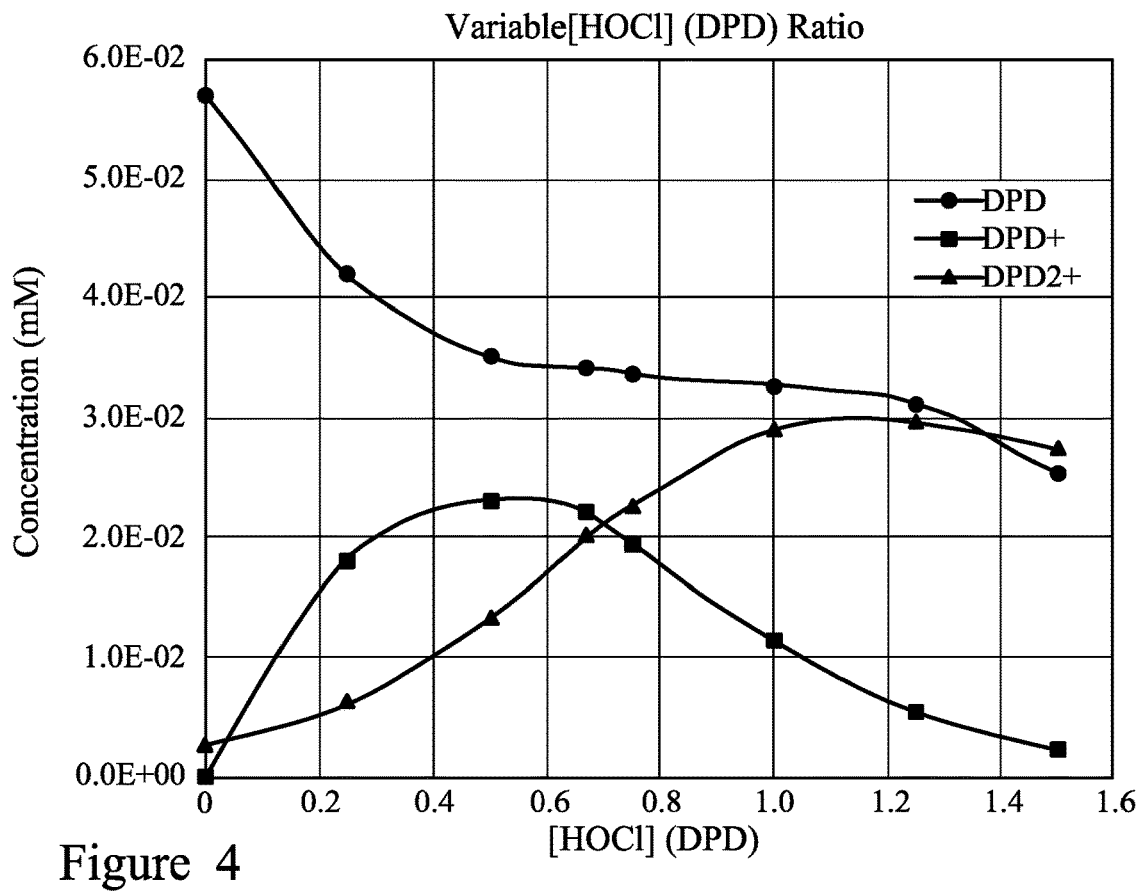
FIG. 4 illustrates the reaction of DPD with various concentrations of HOCl.
Figure 5:
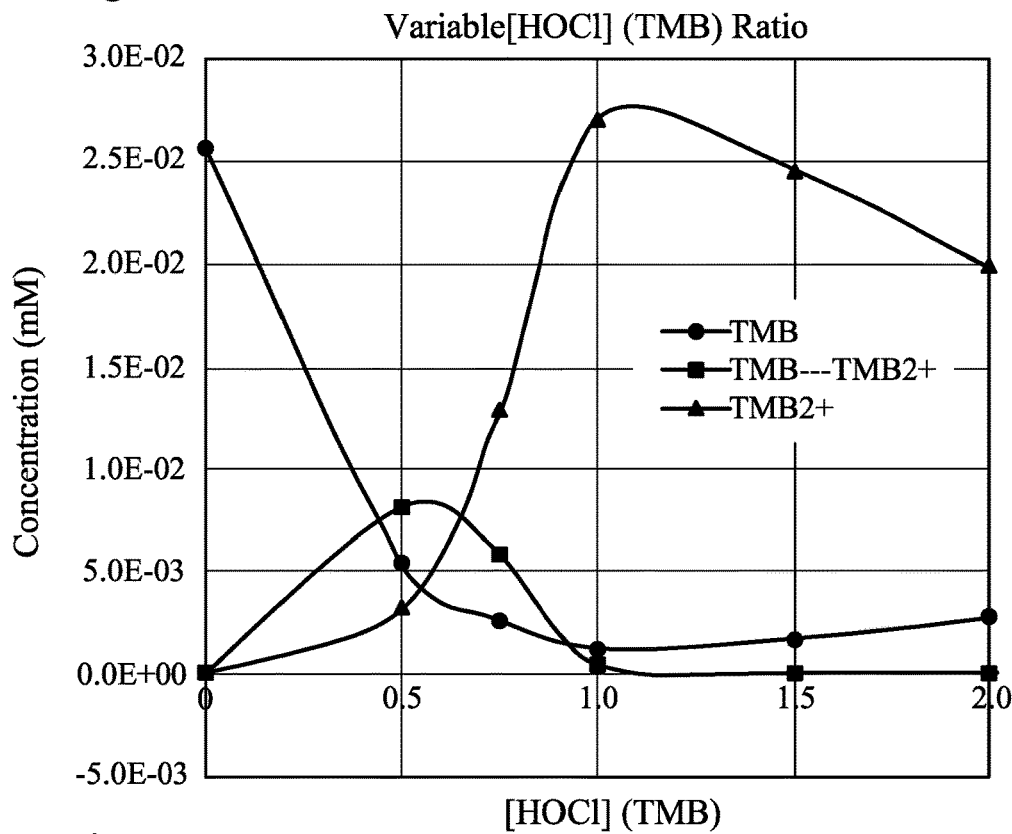
FIG. 5 illustrates the reaction of TMB with various concentrations of HOCl.

FIG. 3 shows schematically an embodiment of an electrochemical sensor 1 of the invention. The electrochemical sensor 1 comprises a substrate in the form of a polymeric strip on to which successive layers are deposited progressively by screen printing. A first successive layer is composed of four parallel spaced apart conductive tracks of silver. Each of the conductive tracks terminates near to a first end 11 of the strip in an electrical contact 10. A first of the four conductive tracks constitutes a reference electrode 4. On a second of the four conductive tracks near to a second end 13 of the strip is deposited carbon to form a counter electrode 5. On a third of the four conductive tracks near to the second end 13 of the strip is deposited carbon to form a first working electrode 6. On a fourth of the four conductive tracks near to the second end 13 of the strip is deposited carbon to form a second working electrode 7. The working electrodes 6, 7 flank the reference electrode 4 and the counter electrode 5.

Over the top of each electrode 4, 5, 6, 7 is screen printed an insulating layer of a non-conductive ink (shown partially removed in FIG. 3). During screen printing, a screen used to deposit the non-conductive ink is such that the electrical contacts 10 and the electrodes 4, 6, 7 are left exposed through a window.

On the first working electrode 6 are deposited doses of a dried reagent formulation of TMB (see below) which is used to measure low concentrations of free chlorine.

|  | Concentration | Unit |
|---|---|---|
| TMB | 1.46 | mM |
| Maleate Buffer | 100 | mM |
| Polyvinylpyrrolidone | 0.05 | % (w/v) |
| Ethanol | 35 | %(v/V) |
| Calcium Sulphate | 5.5 | mM |

On the second working electrode 7 is deposited a layer of a dried reagent formulation of ABTS diammonium salt which is used to measure high concentrations of free chlorine. The formulation of ABTS diammonium salt is:

|  | Concentration | Unit | Comment |
|---|---|---|---|
| ABTS diammonium salt | 2.5 | mM |  |
| Water | n/a | n/a |  |
| Maleate Buffer | 175 | mM | Maintains pH 6 |
| Ethanol | 10 | % | Aids electrode wetting during dosing |
| CMC | 0.125 | % | Sodium salt, medium viscosity. |

Deposited onto the non-conductive ink between the reference electrode 4 and the counter electrode 5 is a deposit 15 of doses of potassium chloride acting as a supporting electrolyte.

Figure 6:
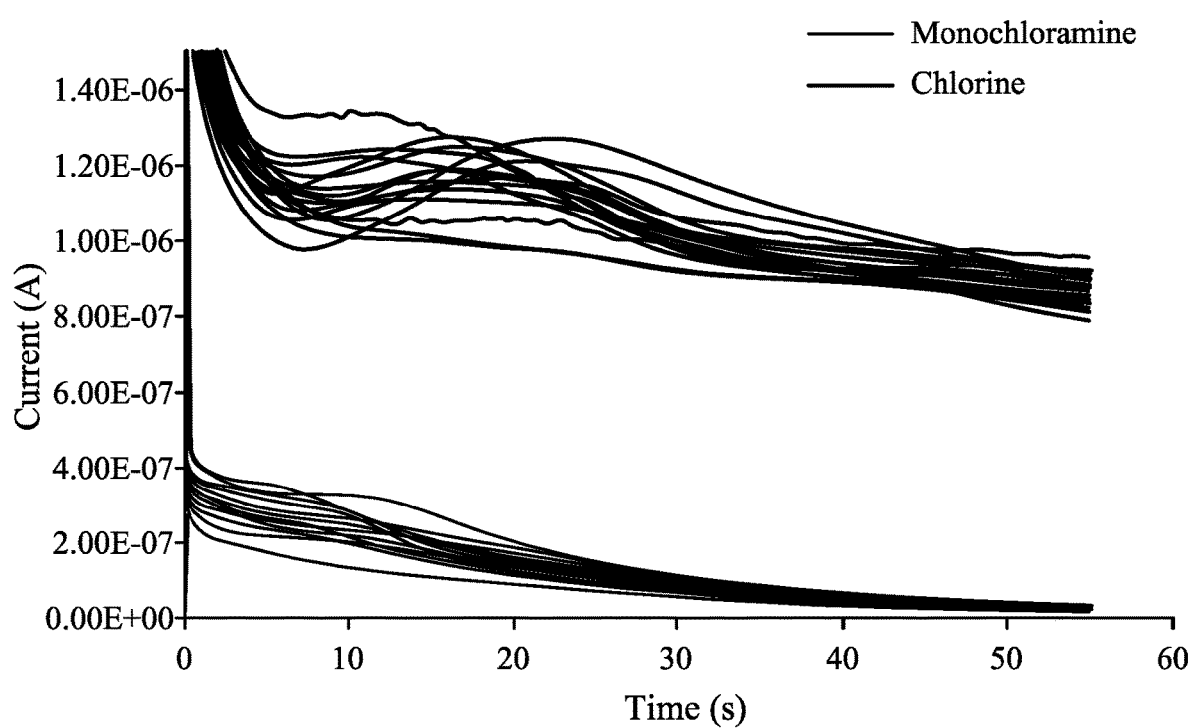
FIG. 6 illustrates the current response of ABTS diammonium salt to free chlorine (upper) and monochloramine (lower).

The ABTS diammonium salt formulation was buffered to pH 6 using sodium maleate to allow the sensor to work in chlorine solutions across the pH range 4-9. At low pH (~2), ABTS diammonium salt reacts with chlorine and monochloramine so high monochloramine interference is observed. At high pH (~6), ABTS diammonium salt reacts with monochloramine slowly and interference is reduced. FIG. 6 illustrates the current response of ABTS diammonium salt to free chlorine (upper) and monochloramine (lower).

The different operational ranges of concentration demonstrated for TMB and ABTS diammonium salt in FIG. 1 enable the embodiment of the invention shown in FIG. 3 to be used as a dual sensor with a broad operational range of concentration. Detection of free chlorine is optimised to enable high accuracy detection of free chlorine at low concentration on the first working electrode 6 and high accuracy detection of free chlorine at high concentration on the second working electrode 7. A potentiostat measures both of the first and second working electrodes 6, 7 at the same potential. The analysis time interval for both the first and second working electrodes is 45-55 seconds and the applied potential is −200 mV.

The invention claimed is:

1. An electrochemical sensor for determining the presence or quantity of an analyte in a sample comprising:
   an elongate substrate layer having a first end opposite to a second end;
   first, second and third conductive tracks deposited axially onto the substrate layer in a substantially parallel mutually spaced apart relationship, wherein the first conductive track constitutes a reference electrode, wherein on the second conductive track near to the second end of the substrate layer is a conductive deposit whereby to constitute a counter electrode and on the third conductive track near to the second end of the substrate layer is a conductive deposit whereby to constitute a working electrode, wherein each of the first, second and third conductive tracks terminates near to the first end of the substrate layer in an electrical contact;
   a non-conductive layer deposited on the first, second and third conductive tracks, wherein the non-conductive layer is fabricated to fully expose each electrical contact near to the first end of the substrate layer, to expose the conductive deposit on the second conductive track near to the second end of the substrate layer, to expose the first conductive track near to the second end of the substrate layer and to expose one or more discrete working regions of the conductive deposit of the third conductive track near to the second end of the substrate layer; and
   a reagent formulation of a salt of 2,2'-azino-bis(3-ethylbenzothiazoline-6-sulfonic acid) (ABTS) deposited on or near to the one or more discrete working regions of the conductive deposit of the third conductive track, wherein the reagent formulation of a salt of ABTS is deposited exclusively on the third conductive track;
   a fourth conductive track deposited axially onto the substrate layer, wherein the first, second, third and fourth conductive track are in a substantially parallel mutually spaced apart relationship, wherein on the fourth conductive track near to the second end of the substrate layer is a conductive deposit whereby the third and fourth conductive tracks constitute a pair of working electrodes, wherein the fourth conductive track terminates near to the first end of the substrate layer in an electrical contact, wherein the non-conductive layer is deposited on the fourth conductive track and is fabricated to fully expose the fourth conductive track, wherein an additional reagent formulation is deposited on or near to the one or more discrete working regions of the conductive deposit of the fourth conductive track, wherein the additional reagent formulation is deposited exclusively on the fourth conductive track; and wherein the additional reagent formulation is an additional reagent formulation of TMB, DPD, orthotolidine or syringaldazine.

2. An electrochemical sensor as claimed in claim 1 wherein the reagent formulation further comprises a buffer which in use maintains the pH in the range 5 to 6.

3. An electrochemical sensor as claimed in claim 2 wherein the buffer is an acidic salt.

4. An electrochemical sensor as claimed in claim 1 wherein the first and second conductive tracks are flanked by the third and fourth conductive tracks.

5. An electrochemical sensor as claimed in claim 1 wherein the additional reagent formulation is an additional reagent formulation of TMB.

6. An electrochemical sensor as claimed in claim 1 wherein the salt of ABTS is the diammonium salt of ABTS.

7. An electrochemical sensor as claimed in claim 1 wherein the analyte is free chlorine.

\* \* \* \* \*